3,450,797
PROCESS FOR OBTAINING A CONTROLLED INCREASE IN THE MOLECULAR WEIGHT OF UNSATURATED POLYMERIC HYDROCARBONS
Johannes Schäfer, Gerhard Berg, and Frederico Engel, Marl, Germany, assignors to Chemische Werke Huls A.G., Marl, Germany
No Drawing. Filed Feb. 1, 1966, Ser. No. 523,921
Claims priority, application Germany, Feb. 1, 1965, C 34,988
Int. Cl. C08d 5/02, 9/00
U.S. Cl. 260—888      2 Claims

ABSTRACT OF THE DISCLOSURE

A method of increasing the molecular weight of a mixture of at least two different solution polymerized diolefin polymers, by adding to a solution of such polymers, a catalyst system of:

(a) A compound of the formula:

$$R_n^1 Me X^1_{y-n}$$

wherein

Me is B, Al, Ga, Be, Mg, Ca, Zn, Si, Sn, As, Sb, Ti, Zr, P, Mo, W, Bi, Fe, Hg, Cd, V, U, or VO;
$X^1$ is F, Cl, Br, or I;
$R^1$ is hydrogen, or an alkyl, cycloalkyl, aryl, aralkyl, alkoxy, or sulfoxy residue, or a carboxylate anion;
$y$ is the valence of Me; and
$n$ is a number between 0 and the valence of Me, inclusive; and (b) A compound different from compound (a), and of the formula $$RX$$

wherein

R is a residue selected from the group consisting of halogeno, alkyl, cycloalkyl, aryl, aralkyl, acyl, thionyl, sulfuryl, chromyl, vanadyl, phosphorus oxy, thiophosphorus, sulfonic acid, sulfinic acid, arsenic oxy, antimony oxy, titanyl, imide, or a component selected from the group consisting of phosphorus, arsenic, sulfur, selenium, vanadium, titanium, tin, or silicon, and
X is at least one halogen atom,
wherein component (a) is added in amounts of from 0.01 to 10% by weight of the polymers present, and the catalyst component (b) is added in quantities of 0.002 to 2 mols per mol of component (a), and the addition of the catalyst components is such that component (a) is added first and the reaction mixture is mixed until a homogeneous dispersion is obtained, and then component (b) is added in proportion to the desired increase in molecular weight.

---

This invention relates to a process for the production of unsaturated polymeric hydrocarbons having high Mooney viscosities.

In the production of polymeric hydrocarbons by catalytic solution polymerization, the viscosity of the reaction mixture normally increases with increasing conversion, the increase in viscosity being dependent upon the concentration and the molecular weight of the dissolved polymer. With increasing viscosity, however, it becomes more and more difficult to remove the heats of polymerization and agitation. Therefore, to avoid runaway reactions, the polymer concentration is normally maintained at values between 5 and 20%, and the Mooney viscosity (ML-4) at about 30 to 100.

Today, polymers having high Mooney viscosities (100 to 150) are of ever increasing technical importance, but though there are a number of modified polymerization processes for their production, such processes can be conducted only with substantial difficulties. For example, if low space-time yields or impractical reaction conditions are to be avoided, it is often necessary to employ extremely pure reaction components and solvents.

Likewise, though it has been suggested to increase the molecular weight of polybutadiene or polyisoprene by adding to the polymerization mixture arylazo or arylhydrazo compounds in quantities of 0.2 to 3% by weight, these azo compounds are relatively ineffective with other unsaturated polymeric hydrocarbons, yielding little or no increase in molecular weight.

Furthermore, it is known that buadiene copolymers containing nitrile groups can be cross-linked with a metallic halogenide of the Lewis acid type and a liquid halogen compound having at least two mobile halogen atoms. This is accomplished by mixing these two compounds into a liquid solvent-free copolymer—before or after admixture of carbon black and heating to 150° C. Although this cross-linking technique does, in fact, increase polymericular weight, the final products have limited utility.

An object of this invention, therefore, is to provide an improved process for the production of polymers having a high Mooney viscosity.

Upon further study of the specification and claims, other objects and advantages of the present invention will become apparent.

To attain the objects of this invention, it has now been discovered that the molecular weight of unsaturated polymeric, preferably elastomeric hydrocarbons, produced by the catalytic polymerization of diolefins, or copolymerization of mono- with diolefins, or copolymerization of various diolefins with one another in inert organic solvents, having molecular weights of 1,000–1,000,000, preferably 100,000–800,000, and particularly 200,000–600,000, can be further increased in a simple manner if the reaction mixture containing the various homo- or copolymers is reacted, after the polymerization is terminated or after the desired conversion has been reached, with a catalyst system comprising:

(a) A compound of the general formula:

$$R_n^1 Me X^1_{y-n}$$

wherein

Me is B, Al, Ga, Be, Mg, Ca, Zn, Si, Sn, As, Sb, Ti, Zr, P, Mo, W, Bi, Fe, Hg, Cd, V, U, or VO;
$X^1$ is F, Cl, Br, or I;
$R^1$ is hydrogen, alkyl, cycloalkyl, aryl, aralkyl, alkoxy, sulfoxy residue, or a carboxylate anion;
$y$ is the valence of Me; and
$n$ is a number between 0 and the valence of Me, inclusive; and (b) A compound of the general formula:

$$RX$$

wherein
R is a halogen, alkyl, cycloalkyl, aryl, aralkyl, acyl, thionyl, sulfuryl, chromyl, vanadyl, phosphorus oxy, thiophosphorus, sulfonic acid, sulfinic acid, arsenic oxy, antimony oxy, titanyl, or imide residue, phosphorus, arsenic, sulfur, selenium, vanadium, titanium, tin, silicon, and
X is a halogen.

The catalyst component (a) is added in amounts of from 0.01 to 10% by weight, preferably 0.01 to 5% by weight, and particularly 0.2 to 2% by weight, based on the weight of polymer present, and the catalyst component (b) is, in turn, added in amounts of from 0.002 to 2 mols, preferably 0.005 to 1 mol, and particularly 0.01 to 0.6 mol, per mol of the catalyst component (a).

Unsaturated polymeric hydrocarbons include those produced from monomers having preferably 2 to 20, more preferably about 2 to 6 carbon atoms. Among the suitable unsaturated polymeric hydrocarbons are, for example, polybutadiene, polyisoprene, as well as copolymers of, for example, butadiene or isoprene with mono-olefins containing preferably up to 20 carbon atoms, such as, for example, styrene. Still further polymers include butyl rubber (isobutylene/isoprene copolymer) as well as ethylene/propylene copolymers containing an unsaturated third component, such as biscyclopentadiene.

Such polymers can be produced by conventional catalyst systems. For example, polybutadienes can be produced by the polymerization of butadiene with the two different well-known catalyst systems:

(a) titanium compounds/organometallic compounds, wherein preferably iodine-containing titanium compounds are used, or titanium tetrachloride or/and titanium tetrabromide are used in the presence of iodine-yielding compounds; and (b) cobalt and/or nickel compounds/organometallic compounds.

Likewise, polyisoprenes can be produced with the mixed catalysts of titanium compounds/organometallic compounds; and the ethylene/propylene copolymers can be obtained with mixed catalysts of vanadium compounds/organometallic compounds. Still further, polybutadienes, polyisoprenes, as well as copolymers thereof, for example butadiene or isoprene with mono-olefins, such as, for example, styrene, can be produced with alkali metals, such as lithium, sodium, and/or potassium in particular, and the organic compounds of these metals.

These various polymeric hydrocarbons can be employed in the form of polymerization solutions, or as a solution of polymers in suitable inert solvents at any desired mixture proportions. Thus, the polymerization or polymer solutions, such as, for example, the polybutadiene produced with the catalyst system of ethyl aluminum sesquichloride/cobalt octoate, and a polyisoprene produced with the catalyst system of aluminum triisobutyl/titanium tetrachloride, can be homogeneously mixed with each other at the desired proportions after the polymerization processes are terminated or after the desired conversions have been reached, without destroying the polymerization catalysts. The resultant mixed reaction mixture can then be reacted with the catalyst system according to the invention.

In this connection, mixtures of various polymerization or polymer solutions, as well as mixtures of the two solutions with each other are defined as the reaction mixture. Of course, the molecular weight of the employed polymers can be the same or different.

Said polymerization solutions are defined as solutions of still active catalysts, the polymers produced by such catalysts from the corresponding monomers and occasionally remaining monomers.

The polymer solutions, however, are defined as solutions either of beforehand purified polymers or polymerization solutions in which the catalysts have been deactivated.

In many of the polymerization reactions now being used, considerable technical difficulties are encountered in attempting to produce polymers having Mooney viscosities substantially higher than ML-4=50. However, such polymers having ML-4 viscosities as high as 90 and 140 are quite useful, especially in the production of oil-plasticized rubbers, and thus there exists a need for an economical and simplified process of producing the same. According to the present process, it is now possible, in a simple manner, to increase the Mooney viscosity of such polymers for example from 20 to 50, or from 20 or 50 to 90–140.

A special advantage of this process resides in that the molecular weight can be kept low during the polymerization proper, whereby caking of polymers on the inner walls of the reaction vessels and pipelines can be substantially decreased. This advantage is particularly of value in solution polymerization processes wherein the corresponding polymer remains in solution and the viscosity of the reaction mixture is thereby increased with increasing conversion and increasing molecular weight.

Solvents employed in such solution polymerization processes are especially hydrocarbons of 3–30 carbon atoms, such as, for example, aliphatic or cyclic saturated or unsaturated hydrocarbons, as well as aromatic hydrocarbons, such as, for example, benzene, hexane, butane, isopropyl cyclohexane, and the homologs and isomers therefor.

The catalyst system to be employed for increasing the polymericular weight of the preformed polymer is comprised of two components. The first component (a) is defined by the general formula $$R_n^1 MeX^1{}_{y-n}$$

wherein
Me is B, Al, Ga, Be, Mg, Ca, Zn, Si, Sn, As, Sb, Ti, Zr, P, Mo, W, Bi, Fe, Hg, Cd, V, U, or VO;
$X^1$ is F, Cl, Br, or I;
$R^1$ is hydrogen, alkyl (preferably of 1 to 20 carbon atoms), aryl (preferably of 6 to 20 carbon atoms), alkoxy (preferably of 1 to 20 carbon atoms), sulfoxy residue or a carboxylate anion (preferably of 1 to 20 carbon atoms);
y has the valence of Me; and
n has a value between 0 and the valence of Me, inclusive.

When $R^1$ contains an aryl group, it is preferably hydrocarbon aryl; likewise, the carboxylate anion is preferably a derivative of a hydrocarbon caroxylic acid.

Compounds of this type include boron halides, such as $BF_3$ or $BCl_3$, or organometallic halides, such as boron halogenides wherein one or two of the halogen atoms are replaced by an organic radical $R^1$ as defined above, such as $R^1$—$BCl_2$, $R_2^1$—$BCl$, or $R_3^1$—$B_2Br_3$; the same relationship is applicable when Me is Al or Ga. Other suitable catalysts are Grignard's reagents, viz., alkyl or aryl magnesium halides, or similar organometallic halides having Mg replaced by Be, Ca, or Zn; silicon and tin tetrahalides, such as, for example, $SiCl_4$ or $SnCl_4$ and similar compounds wherein one or several halogen atoms are replaced by the organic radical $R^1$, as exemplified by phenyl or alkyl silicon or tin trihalides. Still further examples include titanium and zirconium tetrahalides, and titanium and zirconium oxyhalides, vanadium tetrahalide, vanadium oxyhalide, and anhydrous ferric halide, as well as similar compounds thereof wherein one or two halogen atoms have been replaced by $R^1$.

In order to carry out the reaction of this invention in a reproducible and expedient manner, it is preferable to select from among the above a catalyst which is soluble in the organic solvent employed for the specific reaction. Inasmuch as many of these catalytic compounds have an electron deficiency in their atomic structure, it is possible, in a conventional manner, to render such compounds more soluble in the chosen solvent by the addition of ethers, amines, or phosphines thereto. Even though the activity of these catalysts is somewhat lessened thereby, the decrease in the rate of polymerization is often advantageous since the reaction can then be controlled with greater facility. Various, widely differing ethers, phosphines, and amines may be used satisfactorily to solubilize the catalysts. The precise structure of such solvent intermediaries is thus of little importance; for example, similar satisfactory results are obtained with diethyl ether on the one hand and tetrahydrofuran on the other.

The second component designated (b) is represented by the general formula RX. In this formula, which need not follow stoichiometrical laws perforce, R is a halogen, alkyl, cycloalkyl, aryl, aralkyl, acyl, thionyl, sulfuryl, chromyl, vanadyl, phosphorus oxy, thiophosphorus, sulfonic acid, sulfinic acid, arsenic oxy, antimony oxy, titanyl, or imide residue, phosphorus, arsenic, sulfur, selenium, vanadium, titanium, tin, silicon; and X represents halogen.

These RX compounds are added in quantities of 0.002 to 2 mols, preferably 0.005 to 1 mol, and particularly 0.01 to 0.6 mol per mol of the catalyst component (a).

When R is alkyl, cycloalkyl, aryl, aralkyl, or acyl, it is preferred for R to have not more than 30 carbon atoms. In addition, it is preferred that the aryl group is hydrocarbon and that the acyl group is a derivative of hydrocarbon carboxylic acid.

Examples of compounds within the scope of this formula are primary, secondary, and tertiary alkyl or aryl halogenides, the alkyl groups preferably containing 1 to 20 carbon atoms; and the aryl group being preferably hydrocarbon aryl containing 1 to 20 carbon atoms.

Preferred examples of halogenated hydrocarbons include ethyl chloride, cyclohexyl bromide, isopropyl chloride, phenylethyl chloromethane, triphenyl chloromethane, tert.-butyl chloride, tert.-butyl bromide, tert.-hexyl chloride.

It was discovered that tertiary halogenides exhibit the strongest molecular-weight-increasing effect, the secondary ones somewhat weaker, and the primary halogenides much weaker.

In addition to the above halogenated hydrocarbons, other halogenides can be employed, such as acyl halides of mono- or polybasic organic acids. Generally, the presence of one acyl halide function in the molecule is sufficient. The other carboxyl groups can, for example, be esterified, etherified, or can be present in the amide form. Examples of such compounds are phosgene, acetyl halides, the homologs and isomers thereof; benzoyl halides and the homologs thereof; phthalyl halides, malonyl and adipyl halides; unsaturated acyl halides, and aminoacyl halides. Other suitable halogenides include organic sulfur halogenides, such as, for example, sulfonyl halides, sulfinyl halides, as well as sulfur halogenides. In general, the number of carbon atoms in the acid residue is preferably about 1 to 20, more preferably about 1 to 12.

In addition to relatively low molecular weight halogenides, halogen-containing polymers are likewise suitable, such as, for example, polymers and copolymers of vinyl chloride, vinylidene chloride, or chloroprene. Likewise, there can be used halogenated and sulfo-halogenated polymeric hydrocarbons, such as, for example, those based on ethylene, propylene, butylene, styrene, and homologs and isomers thereof.

Still further, there can be used polymeric acid halogenides, such as polymers of chlorinated unsaturated carboxylic acids or copolymers of unsaturated acyl halides with other unsaturated compounds. These polymers can be produced conventionally, by homo- or copolymerization of halogen-containing, unsaturated compounds, or by halogenation or also sulfo-halogenation in either solution or solid form (for example fluid-bed process) of polymers or by the halogenation of polymers having free carboxyl groups or sulfonic or sulfinic acid groups.

Aside from organic halogenides, halogens themselves can be employed. Suitable are not only chlorine, bromine, and iodine, but also mixed halogens, such as, for example, iodine chloride.

Still further, metallic and non-metallic halogenides which are either soluble per se or can be solubilized in organic solvents are particularly useful as RX compounds, such as, for example, thionyl chloride, sulfuryl chloride, chromyl chloride, titanium tetrachloride, titanyl chloride, vanadium pentahalides, vanadium tetrachloride, vanadium oxychloride, phosphorus trichloride, phosphorus oxychlorides, arsenic oxyhalides, antimony halides, antimony oxyhalides, sulfur halides, selenium halides, and, for example, halogen succinimide (a species of halogen-substituted imide). In place of the above-mentioned chloride, the corresponding bromides and iodides are likewise active.

In addition to halogen compounds, likewise suitable are anhydrides of carboxylic acids, such as, for example, aliphatic and aromatic monocarboxylic acids, anhydrides of di-, tri-, etc. polycarboxylic acids, and also mixed anhydrides. Specific preferred examples are acetic acid anhydride, maleic acid anhydride, a mixed anhydride of acetic acid and stearic acid, an phthalic acid anhydride. The anhydride contains preferably 3 to 20 carbon atoms.

As stated hereinbefore, the first catalyst component is employed in concentrations of from 0.01 to 10% by weight. Normally, however, concentrations of 0.2 to 2% by weight, based on the polymer, are sufficient. This catalyst component reacts, in case alkali metals or alkali metal-organic compounds are used as the catalysts, first with the alkali catalyst in approximately equimolar quantities. Consequently, this reaction product of equimolar quantities is not effective for the reaction involving the molecular weight increase. For economical reasons, therefore, it is recommended to inactivate the alkali catalyst by means of other chemicals, such as, for example, titanium tetrachloride, as used in Example 2 described hereinafter.

The second catalyst component (b) which, of course, must be different from the first component (a) is normally required in far lower concentrations. From a quantitative standpoint, these concentrations range between 0.002 to 2 mols, but preferably from 0.005 to 0.6 mol per mol of the first catalyst component (a).

This reaction for increasing the molecular weight is conducted in such a manner that, at the end of the polymerization reaction, or after the desired conversion has been reached, there is first added to the reaction mixture or to the mixture of various reaction mixtures the catalyst component (a), and the reaction mixture is agitated until a homogeneous mixture or solution is obtained. Thereafter, as set forth in the examples, the catalyst component (b) is added in one portion or batchwise in incremental portions. When it is added batchwise, there normally occurs a somewhat greater increase in the molecular weight. The increase in molecular weight is greater when a greater quantity of catalyst component (b) is employed.

In many cases, a quantity of the first (a) and sometimes the second (b) catalyst component is already present in the polymerization solutions to be mixed with one another, if these contain mixed catalysts in sufficient quantities according to Zeigler and Natta. However, if the polymerization solutions to be mixed contain only alkali metals or the organic compounds thereof as the catalysts, or if catalyst-free polymer solutions are involved, the first catalyst component must be added in the former case and both components in the latter case. Even when only one of a mixture of polymerization reaction mixtures contain, in addition to the above-mentioned mixed catalysts, alkali metal catalysts, it is nevertheless advantageous to add the first catalyst component.

The temperature of the reaction mixture can range between —50° C. and 100° C. Suitably, the catalysts are added at room temperature or at the polymerization temperature. After a reaction time which can amount to up to 10 hours, preferably, however, not more than 10 minutes, and more preferably not more than one minute, the reaction mixture is worked up in a conventional manner, if desired by destroying the catalyst with alcohol or ketones, precipitation of the polymer with alcohol, or driving off the solvent with steam.

By the advantageous method of this invention, it is possible to add to preformed polymers several catalyst components which, in most cases, are economical and readily available and, in a simple manner, achieve the desired molecular weight increase without an additional gel formation step. Additionally, the properties of the polymer can be varied, as in the case of polybutadiene, such that vulcanized products produced from these polymers will exhibit an improvement in their tear resistance. A further important advantage of this method is that the tendency of the raw polymers to flow is substantially diminished. Moreover, the polymers can be processed more easily, and in particular are amenable to injection molding.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

(a) Production of the polyisoprene solution 100 parts by weight of isoprene in 620 parts by weight of hexane are polymerized with the aid of 0.11 part by weight of butyl lithium at 50° C. under the exclusion of air. The ML-4 viscosity of the produced polymer is at ML-4=37.

(b) Production of the polybutadiene solution 100 parts by weight of butadiene-1,3 in 620 parts by weight of benzene (water content: 44 p.p.m.) are polymerized with the aid of a catalyst system consisting of 2.0 parts by weight of ethyl aluminium sesquichloride and 0.0014 part by weight of cobalt in the form of cobalt octoate. For controlling the molecular weight, there is added to the charge, before the butadiene-1,3 is added, 0.22 part by weight of butadiene-1,2. The ML-4 viscosity of the produced polymer is about 53.

(c) Conducting the molecular weight increasing step

The above-described polyisoprene and polybutadiene solutions are combined and mixed with two portions of 0.03 mol sulfuryl chloride each per mol of ethyl aluminum sesquichloride, the portions being added at a 30 minute interval. Thereafter, the catalyst is decomposed with acetone; a benzenic solution of 1% di-tert.-butyl-p-cresol, based on the polymer, is added; the polymer is isolated by driving off the solvent with steam and is then dried. The resultant ML-4 viscosity of the polymer is 84, and the gel content is 3% by weight.

When using other weight proportions of polybutadiene with respect to polyisoprene, similar results are obtained; also, similar results are achieved when using different catalysts, such as, for example, benzyl chloride, acetyl chloride, and succinic acid dichloride, instead of the sulfuryl chloride.

EXAMPLE 2

(a) Polybutadiene solution

The polyisoprene solution is produced according to Example 1a, but the water content in this case is 53 p.p.m. The ML-4 viscosity is 57.

(b) Production of and ethylene/propylene copolymer

The copolymer of ethylene, propylene, and biscyclopentadiene is withdrawn from a continuously operating polymerization plant. The quantites, with respect to weight, of the charged components are, per unit of time, about 1,900 parts by weight of hexane as the solvent, 36 parts by weight of ethylene, 58 parts by weight of propylene, and 6 parts by weight of biscyclopentadiene, 2.0 parts by weight of ethyl aluminum sesquichloride, and 0.25 part by weight of vanadium oxychloride.

The ML-4 viscosity of the polymer to be employed is 58.

(c) Conducting the molecular weight increasing step

The above-described solutions are homogeneously mixed with one another in a weight proportion of 1:1, based on the polymer, and are subsequently mixed with 0.08 mol of thionyl chloride, based on ethyl aluminum sesquichloride of the polymer mixture, in the form of a 0.5 benzenic solution, at room temperature. After a reaction period of 30 minutes, the catalysts are destroyed with acetone. Then, a benzenic solution of 1% di-tert.-butyl-p-cresol, based on the polymer, is added, and the polymer is isolated by driving off the solvent with steam, and is dried thereafter. The ML-4 viscosity after the reaction is 91, and the gel content amounts to 4% by weight.

EXAMPLE 3

(a) Polymerization solution

A polyisoprene solution is produced according to Example 1a, but employing, in place of the ethyl aluminum sesquichloride, diethyl aluminum chloride as the catalyst component, at the same concentration. The water content before the beginning of the polymerization reaction is 48 p.p.m. The ML-4 viscosity of the resultant polymer is 47.

(b) Polymer solution

There is involved a low-molecular 1,4-cis-polybutadiene having a viscosity of about 6,000 cp./20° C. in the form of a 50% by weight benzenic solution.

(c) Conducting the molecular weight increasing step

The polymer solution (a) is mixed with such a quantity of polymerization solution (b) that the weight proportion of high-molecular polybutadiene to low-molecular polybutadiene is 10:1. Subsequently, at one hour intervals, two portions of 0.01 mol each of tert.-butyl chloride per mol of the diethyl aluminum chloride present in the reaction mixture are added in the form of a 0.05% benzenic solution. One hour after the second portion has been added, the catalyst is decomposed as set forth in Example 2, and the reaction mixture is worked up.

The ML-4 viscosity after the reaction is 118, and the gel content is 3% by weight.

EXAMPLE 4

(a) Production of the polybutadiene solution

Into a completely dry, nitrogen-filled reaction vessel there are charged 352 parts by weight of hexane and 88 parts by weight of butadiene. By the addition of 0.352 part by weight of butyl lithium (0.4%, based on butadiene), the polymerization is initiated, and maintained at 50° C. After 24 hours, a conversion of 100% is obtained. The Mooney viscosity of the resultant polybutadiene is 5, and the gel content is below 2%.

(b) Production of the polyisoprene solution

Into a completely dry, nitrogen-filled reaction vessel, there are charged 88 parts by weight of hexane and 22 parts by weight of isoprene. After the addition of 0.066 part by weight of butyl lithium (0.3%, based on isoprene), the polymerization reaction commences immediately and is kept at 50° C. After 5 hours, the conversion of 100%. The Mooney viscosity of the polyisoprene cannot be measured (ML-4<10). The RSV (reduced specific viscosity) value is 0.97, and the gel content is below 2%.

(c) Conducting the molecular weight increasing step

The above-described polybutadiene and polyisoprene solutions are combined in such a manner that the polyisoprene solution is conducted under pressure via an air-free line, into the reaction vessel wherein the polybutadiene solution is present. The weight proportion of polybutadiene:polyisoprene in the mixture is 80:20. For reducing the viscosity of the mixture, the latter is diluted with 330 parts by weight of hexane. Thereupon, 5.5 parts by weight of ethyl aluminum sesquichloride are added in the form of a 20% hexane solution.

To this reaction mixture, there are added at room temperature, at respectively 30 minute intervals, four batches of 0.06 part by weight each of thionyl chloride (at a total of 0.045 mol/mol of ethyl aluminum sesquichloride). Half an hour after the last batch is added, the catalyst is decomposed by the addition of acetone (containing a stabilizer in dissolved form) to the very viscous reaction mixture, and the polymer is precipitated by the addition of methanol. The dry product contains about 1% di-tert.-butyl-p-cresol as the stabilizer. The Mooney viscosity of the reaction product amounts to 72.

EXAMPLE 5

(a) Production of the polybutadiene solution

Into a nitrogen-filled, completely dry reaction vessel, there are charged 360 parts by weight of hexane and 90 parts by weight of butadiene. After the addition of 0.36 part by weight of butyl lithium (0.4%, based on butadiene), the polymerization reaction commences, the polymerization temperature being 50° C. After 4 hours, the conversion is 100%. The Mooney viscosity of the resultant polybutadiene cannot be measured (ML-4<10); the RSV value is 0.77; and the gel content is below 2%.

(b) Production of the polyisoprene solution

Into a nitrogen-filled, completely dry reaction vessel, there are charged 540 parts by weight of hexane and 135 parts by weight of isoprene. The polymerization is initiated by the addition of 0.34 part by weight of butyl lithium (0.25%, based on isoprene), the polymerization temperature being 50° C. After 4 hours, a 100% conversion is attained. The Mooney viscosity of the polyisoprene amounts to 15, the RSV value is 2.0, and the gel proportion is below 2%.

(c) Conducting the molecular weight increasing step

The above-described polybutadiene and polyisoprene solutions are combined, by conducting the polybutadiene solution under pressure via a nitrogen-purged pipeline into the polyisoprene reactor. The weight proportion of polybutadiene:polyisoprene in the mixture amounts to 40:60. After the two polymer solutions have been combined, 11.25 parts by weight of ethyl aluminum sesquichloride are added (5%, based on the total polymer). To this reaction mixture there are added at room temperature, at intervals of respectively 30 minutes, five portions of 0.046 part by weight each of tert.-butyl chloride (a total of 0.233 part by weight=0.0275 mol tert.-butyl chloride per mol of ethyl aluminum sesquichloride). Half an hour after the last portion is added, the catalyst in the very viscous reaction mixture is decomposed by the addition of acetone which contains the stabilizer in solution; and the resultant polymer is precipitated by the addition of methanol. The dry product contains about 1% di-tert.-butyl-p-cresol as the stabilizer. The Mooney viscosity of the reaction product is 60.

EXAMPLE 6

(a) Production of the polybutadiene solution

Into a nitrogen-filled reaction vessel, there are charged 1575 parts by weight of benzene, 285 parts by weight of 1,3-butadiene, 0.66 parts by weight of 1,2-butadiene, for controlling the molecular weight, and 11.4 parts by weight of ethyl aluminum chloride. By the subsequent addition of 0.0179 part by weight of cobalt octoate in the form of a 0.2% benzenic solution, the polymerization process is initiated. After a polymerization period of 4 hours, 90% of the monomer are converted. The Mooney viscosity of the polybutadiene is not measurable (ML-4<10)

(b) Production of the polyisoprene solution

Into a nitrogen-filled reaction vessel, there are charged 720 parts by weight of benzene, 2.04 parts by weight of titanium tetrachloride, 2.36 parts by weight of aluminum triisobutyl, and 80 parts by weight of isoprene. After a polymerization period of 4 hours, 80% of the monomer are converted. The Mooney viscosity of the polyisoprene cannot be measured (ML-4<10).

(c) Conducting the molecular weight increasing step

The above-described polyisoprene and polybutadiene solutions are combined by conducting the polyisoprene solution under pressure via a nitrogen-filled pipeline into the polybutadiene reactor. The weight proportion of the polybutadiene to the polyisoprene in the mixture amounts to 80:20. After the two polymer solutions have been combined, 6.4 g. ethyl aluminum sesquichloride (2%, based on the total polymer) are added. To this reaction mixture there are added at room temperature, at intervals of respectively 30 minutes, six portions of 0.318 part by weight each of thionyl chloride (0.01 mol thionyl chloride per mol of organoaluminum compounds). Half an hour after the last addition is made, the catalyst in the reaction mixture is decomposed by the addition of acetone which contains the stabilizer in dissolved form, and the polymer is precipitated by the addition of methanol. The dry product contains about 1% di-tert.-butyl-p-cresol as the stabilizer. The Mooney viscosity of the reaction product amounts to 46.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

In the appended claims, the term "unsaturated polymeric hydrocarbons" defines polymers which have more than terminal unsaturation, having preferably at least 0.1 and more preferably at least 3 double bonds per 1,000 carbon atoms in each polymer.

What is claimed is:

1. A process for increasing the molecular weight of a mixture of at least two solution polymerized diolefin polymers derived from different monomers containing 2–6 carbon atoms and having an initial molecular weight of 1,000–1,000,000, which process comprises adding a catalyst system to a polymerization reaction mixture containing said polymers in an inert organic solvent, said catalyst system comprising:
  (a) the compound selected from the group consisting of diethylaluminum chloride and ethylaluminum sesquichloride; and
  (b) a compound selected from the group consisting of sulfurylchloride, benzylchloride, acetylchloride, succinic acid dichloride, thionylchloride, a tertiary halogenide of an alkyl group of 1–20 carbon atoms, and a tertiary halogenide of a hydrocarbon aryl group of 1–20 carbon atoms;
wherein component (a) is added in amounts of from 0.01 to 10% by weight of the polymers present, and the catalyst component (b) is added in quantities of 0.002 to 2 mols per mol of component (a), and the addition of the catalyst components is such that component (a) is added first and the reaction mixture is mixed until a homogeneous dispersion is obtained, and the component (b) is added in proportion to the desired increase in molecular weight.

2. A process as defined by claim 1 wherein component (b) is sulfuryl chloride, benzyl chloride, acetyl chloride, succinic acid dichloride, thionyl chloride, or tertiary butyl chloride.

References Cited

UNITED STATES PATENTS

| | | | |
|---|---|---|---|
| 3,135,716 | 6/1964 | Uraneck et al. | 260—94.7 |
| 3,172,881 | 3/1965 | Farrar et al. | 260—94.3 |
| 3,192,192 | 6/1965 | Hartnett | 260—93.7 |
| 3,211,710 | 10/1965 | Hendriks et al. | 260—85.3 |
| 3,317,503 | 5/1967 | Naylor | 260—94.7 |

FOREIGN PATENTS

| | | |
|---|---|---|
| 992,210 | 5/1965 | Great Britain. |
| 483,815 | 6/1952 | Canada. |

SAMUEL H. BLECH, *Primary Examiner.*

M. TULLY, *Assistant Examiner.*

U.S. Cl. X.R.

252—426, 429; 260—45.95, 80.78, 94.7, 889, 890, 894

UNITED STATES PATENT OFFICE
CERTIFICATE OF CORRECTION

Patent No. 3,450,797      Dated June 17, 1969

Inventor(s) Johannes Schäfer, Gerhard Berg and Frederico Engel

It is certified that error appears in the above-identified patent and that said Letters Patent are hereby corrected as shown below:

Column 7, line 67, "polyisoprene" should be --polybutadiene--;
           line 68, "1a" should be --1b--.
Column 8, line 25, "polyisoprene" should be --polybutadiene--;
           line 26, "1a" should be --1b--.

SIGNED AND SEALED
NOV 17 1970

(SEAL)
Attest:

Edward M. Fletcher, Jr.
Attesting Officer

WILLIAM E. SCHUYLER, JR.
Commissioner of Patents